A. W. GREEN.

Improvement in Doubletrees.

No. 132,281.

Patented Oct. 15, 1872.

Witnesses.
Harry King.
Phil. T. Dodge.

Inventor.
Alexander W. Green
by Dodge & Munn
his atty's

UNITED STATES PATENT OFFICE.

ALEXANDER W. GREEN, OF SOUTH DANSVILLE, NEW YORK.

IMPROVEMENT IN DOUBLE-TREES.

Specification forming part of Letters Patent No. 132,281, dated October 15, 1872.

*To all whom it may concern:*

Be it known that I, ALEXANDER W. GREEN, of South Dansville, in the county of Steuben and State of New York, have invented certain Improvements in Arranging and Bracing the Single-Trees of Carriages, &c., of which the following is a specification, reference being had to the accompanying drawing.

My invention relates to an arrangement of devices to prevent the single-trees, when pivoted on top of the double-tree, from pulling it over forward or breaking off their own pivots; and it consists in pivoting a second double-tree behind the first one, and connecting its ends by rods or straps with the upper ends of the single-tree pivots.

Figure 1:
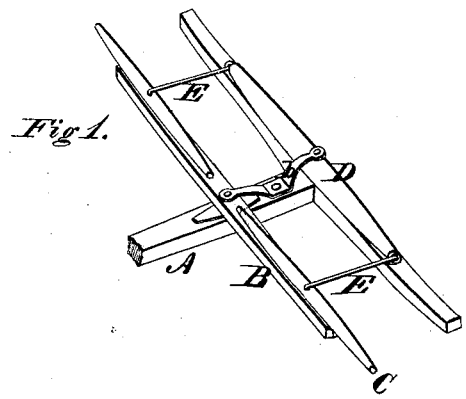
Figure 2:
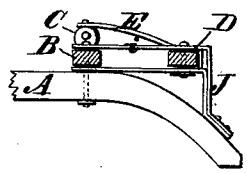
Figure 3:

Figure 1 is a perspective view of my arrangement applied to a straight pole or tongue; Fig. 2, a vertical section of the same applied to a bent pole, the section being taken by the side of and in line with the pole; and Fig. 3, an end view of the extra double-tree, showing one manner of connecting the rods or straps to its ends.

In Fig. 1, A represents a straight carriage-pole or tongue; B, the double-tree pivoted thereon; and C, the single-trees pivoted upon the ends of the double-tree, all of these parts being arranged in the usual manner. When the single-trees are thus arranged on top of the double-tree and their pivots left unsupported at their upper ends they tend both to turn the double-tree over forward and to break their own pivots off. In order to prevent accidents from either of these causes I pivot to the tongue A, behind the double-tree B, a second double-tree, D, and to each end of this extra tree pivot a rod or bar, E, and connect the forward ends of the rods to the upper ends of the respective single-tree pivots, as shown.

The rods or bars E thus applied serve to hold the upper ends of the single-tree pivots, so as to prevent the double-tree from being turned forward or the pivots from being broken off, while at the same time the double-tree is allowed to swing or vibrate with its usual freedom. When the apparatus is to be applied to a pole having its rear end bent downward, an angle-iron or bracket, J, should be attached to the pole, as shown in Fig. 2, so as to support the extra double-tree on a level with the other.

If preferred, the front ends of the rods E may be bent down through the single-trees into the double-tree so as to form the pivots of the single-trees. The rear ends of the rods may be connected to the extra double-tree by eyes, as shown in Fig. 1, or bent around over it and up through its under side, as in Fig. 3.

The two double-trees may have their upper ends supported by a brace, b, attached to the tongue, as in Fig. 1, or by an arm or plate, i, on the bracket J, as in Fig. 2.

Having thus described my invention, what I claim is—

In combination with the single-trees C, pivoted upon the double-tree B, the double-tree D and its rods E, the latter having their forward ends attached to the upper ends of the double-tree pivots in the manner shown, and for the purpose set forth.

ALEXANDER W. GREEN.

Witnesses:
   J. C. GREEN, Jr.,
   GEO. B. BURDITT.